METHOD OF MAKING ELECTRICAL CONNECTION TO SEMICONDUCTOR BODIES

Filed July 21, 1959

INVENTOR.
CLIFFORD A. LEVI
BY Spensley and Horn
ATTORNEYS

United States Patent Office 2,995,473

Patented Aug. 8, 1961

2,995,473

METHOD OF MAKING ELECTRICAL CONNECTION TO SEMICONDUCTOR BODIES

Clifford A. Levi, Lexington, Mass., assignor to Pacific Semiconductors, Inc., Culver City, Calif., a corporation of Delaware Filed July 21, 1959, Ser. No. 828,613
11 Claims. (Cl. 117—201)

This invention relates to semiconductive devices and more particularly to an improved method for fabricating low resistance ohmic contacts to the surface of a body of semiconductive material.

The production of a low resistance ohmic contact to the surface of a body of semiconductive material such as silicon, for example, has long presented a problem in the manufacture of diodes and transistors, and the like. It is especially important, in order to produce a device in which the contact does not appreciably contribute to the parasitic resistance of the completed device. The contact should, in addition to possessing a low resistance, combine good mechanical strength and adherence to the semiconductive body.

Gold or nickel are materials which potentially have all of the hereinabove mentioned properties. The predominant difficulty heretofore encountered has been the apparent inability of the present art methods to produce a contact of gold and nickel to a semiconductive material such as silicon, which is sufficiently adherent to the silicon surface.

The prior art methods for depositing a layer of gold or nickel or a combination thereof onto the surface of a semiconductive body such as silicon, for example, have included high vacuum evaporative deposition, chemi-plating and electro-plating using "local" contacts.

Evaporative deposition or plating involves certain disadvantages for the purpose herein stated in that it requires expensive equipment and presents difficulty in producing uniform layers, especially layers having a controlled average thickness. Further, the evaporation technique typically requires the heating of the surface to be plated to a temperature above the eutectic of gold and silicon or nickel and silicon, or nickel, gold and silicon, thus causing the alloying of the contact with the silicon surface.

Chemi-plating in the past has for the purposes herein mentioned proved to be unsatisfactory in that the layers produced have typically been relatively poorly adherent.

Finally, electro-plating using local contacts, produces uneven plating due to the fact that these local contacts, when coupled with the relatively poor conductivity of the semiconductive material, results in a non-uniform current density across the surface to be plated. Additionally, electro-plated contacts have been poorly adherent to the surface of a plated body.

It is therefore a primary object of the present invention to provide an improved method for producing a gold-nickel contact to the surface of a body of semiconductive material.

Another object of the present invention is to provide a method for producing an ohmic contact to a semiconductive body which minimizes the parasitic resistance of the completed device.

A further object of the present invention is to provide an improved method for producing a low resistance ohmic contact to a semiconductive body including a coating which combines nickel and gold.

Yet a further object of the present invention is to provide a method for producing a low resistance contact of the character described which possesses superior adherence to the surface of a silicon body.

Yet a further object of the present invention is to provide a method of producing a contact of the character described which permits localization of the area of contact.

A still further object of the present invention is to provide a method of producing a contact of the character described which may be effected to an extremely thin region of semiconductive material.

This invention will be described with silicon as the semiconductive material to which contact is to be made and while the method hereinafter to be described is particularly suited to the formation of a contact to silicon, of the character described, it is also applicable to germanium and germanium-silicon alloys. Additionally, it may be used to produce gold-nickel contacts to the intermetallic semiconductive materials such as indium antimonide, lead sulphide, and the like.

This invention is based to a considerable extent upon the discovery that gold-nickel contacts to silicon may be achieved by co-plating gold and nickel together. As a preliminary step in accordance with the method of the present invention the silicon surface to which contact is to be made is exposed to an electroless nickel plating solution which is heated to at least a predetermined temperature. Thereafter a gold chloride solution including other reagents is added to the electroless nickel plating solution.

More particularly, in accordance with the presently preferred embodiment of this invention a gold-nickel low resistance ohmic contact may be produced upon a silicon wafer by first preparing a solution, designated A, of nickelous chloride, sodium citrate, sodium acetate and sodium hypophosphite in the approximate ratios of 30:15:5:10 gms. per liter, respectively. The silicon wafer to be plated is then placed into this solution which is heated to a temperature in excess of 95° C. While maintaining the solution, designated A, at the elevated temperature a second solution, designated B, of the following is added thereto: gold-chloride, hydrochloric acid and hydrofluoric acid in the approximate ratios of 16:30:10 gms. per liter respectively, to which has been added a third solution, designated C, of one part hydrofluoric acid to forty parts distilled water. The combined second and third solutions, designated B and C respectively, are added to the first, designated A, in the proportion of approximately four parts of the second, designated B, to 25 parts of the first, designated A, by volume. A gold-nickel plate, black in color, will plate out upon the silicon wafer in approximately two minutes and will be of the thickness of approximately 0.5 micron.

The novel features which are believed to be characteristic of the invention both as to its organization and method of operation, together with further objects and advantages thereof will be better understood from the following description, considered in connection with the accompanying drawing, in which the presently preferred embodiment of the invention is illustrated by way of example. It is to be expressly understood, however, that the drawing is for the purpose of illustration only, and is not intended as a definition of the limits of the invention.

Figure 2:
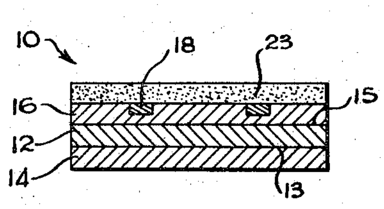
FIGURE 2 is a cross-sectional view of the transistor of FIGURE 1 taken along line 2—2.
Figure 1:
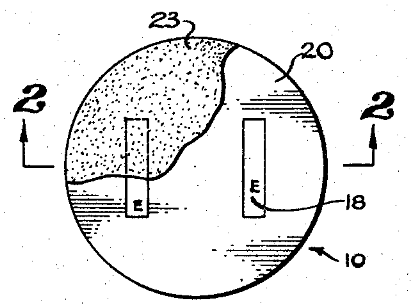
FIGURE 1 is a plan view of a transistor during an early stage of production to which contact is to be made in accordance with the present invention method.

Referring now to the drawing there is shown in FIGURES 1 and 2, a transistor 10 during an early stage of production to which contact is to be made in accordance with the presently preferred embodiment of this invention. The transistor 10 consists of a mono-crystalline silicon body whose outside diameter is approximately ⅞" to 1" and whose thickness is approximately 0.003". The transistor 10 includes a collector region 12 which is of N-type conductivity and which may, for example, be the result of the presence of arsensic introduced during the crystal growing process. On the back surface 13 of the collector region 12 there is an N+ type conductivity region formed, for example, by the diffusion of phosphorous therein. The designation N+ is used to denote a higher concentration of uncompensated donor impurities, e.g., arsensic than by the designation N. The zone 14 may be referred to as the collector contact region. On the opposite surface 15 of the collector zone 12 there is a thin P-type conductivity region 16 which may be formed, for example, by the diffusion of boron therein. This zone 16, called the base zone, will typically be quite thin, i.e., of the order of three microns. Finally, a plurality, herein two, for the purposes of example only, of emitter stripes or regions 18 are formed within the upper surface 20 of base zone 16. The emitter stripes or regions 18 may be formed by the diffusion of phosphorous therein to more than compensate for the arsenic atoms present in the base zone 16.

As has heretofore been stated, it is the purpose of the present invention to provide an improved gold-nickel contact to the surface of a body of semiconductive material. More particularly, for the purpose of example only, it will be assumed that it is desired to provide a gold-nickel contact of the character described to the emitter region 18 and to further provide a plurality of generally rectangular stripe shaped contacts to the base zone 16.

Figure 3:
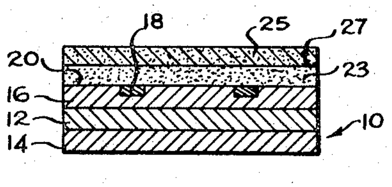
FIGURE 3 is a cross-sectional view of the transistor of FIGURES 1 and 2 during an intermediate stage of production in accordance with the method of the present invention.
Figure 4:
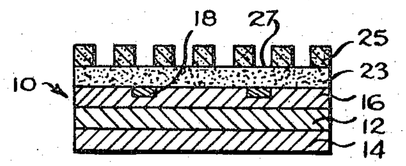
FIGURE 4 is a cross-sectional view of the transistor of FIGURE 3 during a later stage of production.
Figure 5:
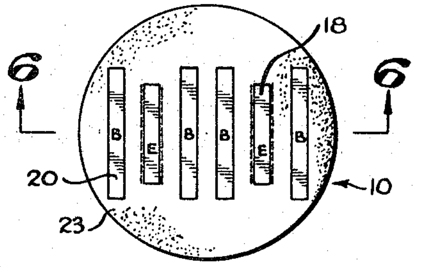
FIGURE 5 is a plan view of the transistor of FIGURE 4 during a still later stage of production.

In order to expose only those areas of the top surface 20 to which so-called front contacts to the base and emitter regions are to be made, it has been found convenient to first thermally grow an oxide coating 23 over the top surface 20 which will result in a coating which will mask the emitter regions 18 as well as the surface 20 of the base zone 16. The oxide coating 23 may be produced by placing the transistor 10 within a furnace which includes an oxidizing atmosphere while maintaining the furnace at approximately 900° C. Next a coating of wax 25 (see FIGURE 3) is applied over the surface 27 of the oxide layer 16. Thereafter stripes coinciding with the contacts to be made to the emitter and base regions, as may best be seen in FIGURE 5, are ruled through the wax coating 25 down to the oxide coating 23 resulting in a configuration as shown in FIGURE 4. The wafer of FIGURE 4 is now placed into a solution of hydrofluoric acid which will contact the oxide coating where exposed, namely, along the stripes where the wax has been removed. As hydrofluoric acid will react with silicon oxide but not with elemental silicon, the oxide coating coincident with the stripes will be removed without any further etching of the silicon wafer.

Figure 6:
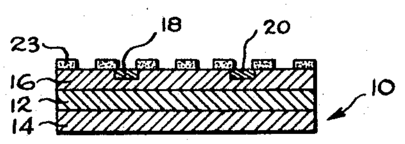
FIGURE 6 is a cross-sectional view taken along line 6—6 of FIGURE 5.

In FIGURES 5 and 6 for purposes of clarity, the wax coating is not shown. In order to deposit the gold nickel contact in accordance with the pattern shown in FIGURES 5 and 6, the wafer is next placed into a solution prepared as follows: Into a 100 ml. beaker is placed 25 mls. of the following solution: nickelous chloride, 30 gms. per liter; sodium citrate, 15 gms. per liter; sodium acetate, 5 gms. per liter; and sodium hypophosphite, 10 gms. per liter. This solution may conveniently be prepared as follows: Into a 1 liter flask there is placed 30 gms. of nickelous chloride; 15 gms. of sodium citrate; 5 gms. of sodium acetate; and 10 gms. of sodium hypophosphite. The flask is then filled with water so that the total volume is 1 liter. Then 25 mls. of the above solution is used as is hereinafter set forth. While it has been found convenient to prepare the solution as hereinabove described, it will, of course, be appreciated that it may be prepared on a larger or smaller scale and it will be further understood that the relative amounts by volume of the various reagents are indicated as being merely approximate.

Next, the pH of this solution, termed for the purpose of clarity of explanation as solution A is preferably adjusted to between 4.0 and 4.5 by the addition of hydrochloric acid thereto although such has not been found necessary. It should be noted at this point that typically, the pH of solution A will be close to 5 prior to its adjustment by the addition of the hydrochloric acid. The transistor of FIGURE 6 is now placed into the solution A and the solution is raised to a temperature of at least 90° C. and preferably 95° C. The heating time to raise the temperature from room temperature to 90° C. is typically from 3 to 5 minutes, although this temperature rise time is not believed to be critical. Further, it has been indicated that the silicon wafer of transistor 10 is placed into the solution A at room temperature. This is not necessarily a limiting factor on the method; that is, the silicon wafer may be placed within solution A after it has been heated to the temperature of at least 90° C. It has been found that a temperature of at least 90° C. is required in order to carry out the present invention method, however, it has been found particularly satisfactory to heat the solution to a temperature of approximately 95° C. to 100° C. which is near the boiling point thereof.

Next, two separate solutions, designated B and C for convenience of explanation, are prepared in two separate beakers. Solution B is prepared by mixing 16 gms. per liter of gold-chloride in 960 mls. of distilled water at room temperature. Thereafter, 30 mls. of reagent grade hydrochloric acid (30 normal) and 10 mls. of reagent grade hydrofluoric acid (48% by weight in water) are admixed. This solution may be prepared in a manner similar to that described above in connection with solution A. That is, 16 gms. of gold-chloride is placed within a 1 liter flask. 30 mls. of hydrochloric acid and 10 mls. of hydrofluoric acid of the hereinabove specified concentrations are added and the flask is filled with water so that the total volume is 1 liter. Here again, the quantities of the reagents are typical and approximate and relative proportions thereof while remaining substantially constant, may be mixed together to produce a larger or a smaller overall quantity thereof. Solution C is next prepared by merely mixing one part of the hydrofluoric acid (48% by weight) to twenty parts of distilled water at room temperature. Next, 100 mls. of solution B is mixed with approximately 100 mls. of solution C at room temperature. Approximately 4 mls. of this combined solution consisting of solutions B and C is now added to solution A (which is 25 mls. in volume) into which the silicon wafer has been placed and the entire solution is stirred. It should be noted that solution A is still maintained at the temperature of approximately 100° C.

In order to generalize the proportions of the reagents hereinabove specified for solutions A, B and C in accordance with the presently preferred embodiment of the invention, the approximate molar ratios thereof have been calculated as the following—

| Solution A: | Mols/l. |
|---|---|
| Nickelous chloride | 0.13 |
| Sodium citrate | 0.05 |
| Sodium acetate | 0.04 |
| Sodium hypophosphite | 0.09 |

Solution B:

| | Mols/l. |
|---|---|
| Gold chloride | 0.04 |
| Hydrochloric acid | 0.36 |
| Hydrofluoric acid | 0.24 |

Solution C:

| | |
|---|---|
| Hydrofluoric acid | 1.15 |

100 mls. of solution B plus 100 mls. of solution C results in these ratios—

Solutions B and C:

| | Mols/l. |
|---|---|
| Gold chloride | 0.02 |
| Hydrochloric acid | 0.18 |
| Hydrofluoric acid | 0.7 |

The following ratios result from combining all of solution A above, or 25 mls. thereof, together with 4 mls. of the combined solutions B and C above.

Solutions A, B and C:

| | Mols/l. |
|---|---|
| Nickelous chloride | 0.11 |
| Sodium citrate | 0.04 |
| Sodium acetate | 0.03 |
| Sodium hypophosphite | 0.08 |
| Gold chloride | 0.003 |
| Hydrochloric acid | 0.03 |
| Hydrofluoric acid | 0.10 |

The solution consisting of a mixture of solutions A, B and C which contains the silicon wafer will first turn black in approximately one minute and then quickly brown for approximately one minute and then black again. After the solution turns black again the beaker containing the solution is removed from the heat source with the silicon wafer still therein contained and the solution is decanted. It has been observed that sometimes the solution will remain brown; that is, after having first become black, it will turn brown, but not necessarily return to the black color. If this occurs, it has ben found desirable to permit the silicon wafer to remain in the solution while it is maintained at the temperature for approximately one minute after it first turns brown.

Figure 7:
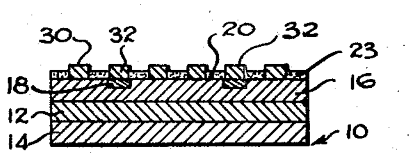
FIGURE 7 is a cross-sectional view of the transistor of FIGURES 1 and 2 to which contact has been made in accordance with the method of the present invention.

The wafer is now removed from the beaker and washed in distilled water at room temperature. Filter paper is then used to dry the wafer and a cotton swab is employed to remove any precipitated debris or reaction products from the solution which may have deposited out upon the wafer. The wafer which has been subject to the hereinabove process will now appear as shown in FIGURE 7 with a plurality of stripe shaped contacts 30 and 32 upon the surface 20 of the transistor with the stripes 30 making contact with the base region 16 and the stripes 32 making contact with the emitter regions 18. The thickness of the stripes 30 and 32 will typically be approximately 0.5 micron.

One of the important aspects of the present invention method is the manner in which the oxide coating 23 serves as a mask to localize the pattern of the contacts 30 and 32. While in connection with the description of the method of producing localized contacts, mention was made of producing the oxide film by heating the silicon wafer in an oxidizing atmosphere, such was not intended as a limitation. In fact, it has been found that the active oxide film which normally is formed upon the surface of a silicon wafer when heated and exposed to the ambient is capable of and in fact does serve to mask those areas to which contact is to be avoided. Further, any other method known to the art may be used to produce the oxide coating such as, for example, evaporation of silicon monoxide upon the surface of the semiconductive wafer.

Another feature of the present invention, which is perhaps the most important, is the fact that the gold-nickel contact does not alloy with the silicon but rather is a surface metallizing process. Thus, no shorting through of the emitter region to the base regions can occur especially when the emitter region is particularly thin. Transistors have been produced in accordance with the present invention method in which the emitter region was of a thickness of 0.5 micron or less. In an alloying technique to produce a contact there is strong likelihood of the contact, upon melting of the silicon, of shorting through the emitter to the base and therefore destroying the transistor characteristics.

Another important advantage inherent in the present invention method for producing a contact to a transistor is the fact that the concentration of the active impurities in the region to be contacted is not in any way altered, inasmuch as it is merely a surface metallized contact. This is particularly important in a high frequency transistor of the type described hereinabove as in such a transistor it has been found important to heavily dope the emitter region with an excess concentration of N-type active impurities. Alloying of this region with the contact would alter the active impurity concentration, and therefore, adversely affect the transistor characteristics of the completed device.

Yet a further advantage of the present invention resulting from the fact that it is a surface metallized contact as opposed to an alloyed one, is the fact that its configuration may be accurately defined by etch techniques in addition to the masking technique hereinabove described. That is, certain chemical etches which will only attack a metal but not silicon, may be used to produce rectangular striped shaped contacts as shown in the plan view of FIGURE 5. One such etch which will attack the metal of the contact and not the silicon surface is aqua-regia. The mechanical strength of the contacts as produced in accordance with the present invention, have been found capable of withstanding a force equivalent to 30,000 G acceleration.

Further, electrical characteristics of the completed device compare favorably with a device produced using an alloy metallized contact without any of its attendant disadvantages as explained hereinabove.

The mechanism which is believed to occur in accordance with the present invention method, although the same has not been definitely established, is as follows:

Initially, the silicon wafer will normally have a native oxide coating thereupon. When the gold solution containing the hydrofluoric acid is added to solution A, the hydrofluoric acid attacks the oxide film. Gold then chemically deposits upon the exposed activated surface of the silicon wafer. As soon as the gold begins to plate upon the activated surface the gold catalyzes the chemical deposition of the nickel, which further catalyzes the further deposition of the gold, etc. The reaction comes to a halt when the gold precipitates out of the solution causing a massive reduction of nickel from the remaining solution.

Subsequent to the formation of the coating stripes 30 and 32 as herein described, it may be desirable to sinter the coating to the silicon wafer. This step may be added with or without a subsequent metal plating as hereinabove discussed. The sintering step is able to improve the adherence of the coating to the silicon but it has not been found necessary.

While the present invention method has been described in particular with the production of front contacts to the emitter and base regions of a transistor, it will be understood that it is equally applicable to the production of a back contact to a transistor or to any other semiconductor device including diodes, transistors, phototransistors, photo-cells, and the like.

Additionally, silver may be deposited atop the gold-nickel contact produced in accordance with the present invention in order to build up the thickness thereof by any method well known to the art including vacuum evaporating deposition, electroplating and the like. Alternatively, other metals such as gold, platinum, rhodium, palladium, or any other noble metal may be used to build up the thickness of the contact produced in accordance with the present invention method.

While hereinabove there has been set forth the reagents and amounts thereof in accordance with the presently preferred embodiment of this invention, several variations, as will hereinafter be described, have been found satisfactory. In solution A the amount of nickelous chloride may be varied from as little as 5 gms. per liter to as much as the 30 gms. per liter designated hereinabove, or higher. To use an appreciably greater amount than 30 gms. per liter of nickelous chloride would offer no advantage as the nickel plates out of solution. Therefore, the molar ratio of the nickelous chloride in solution A may vary from 1/6 the amount set forth hereinabove to as much as that specified, or from 0.02 to 0.13 mol per liter of nickelous chloride.

It has further been found that the citrate of solution A may be used in place of the combination of the citrate and acetate therein and vice-versa. That is, an acetate may be used in place of the citrate and acetate. The latter alternative has been found not to be quite as desirable as the former as the plating produced under such circumstances will not adhere as well to a smooth surface. If citrate, alone is used, an amount from 10 gms. per liter may be satisfactorily employed. The amount of a citrate depends in part upon the amount of nickelous chloride as the citrate serves not only to buffer the solution, but also serves to keep the nickel ions in solution. On the other hand, if the acetate ions are used alone in place of the combined citrate and acetate ions, then between 15 and 20 gms. per liter thereof will be operable. In place of sodium as the radical with the citrate ion, either potassium or ammonium may be used. Similarly potassium or ammonium may be substituted for the sodium ions in the sodium acetate of solution A. It has also been found that sodium hydroxyacetate may be used in place of the sodium acetate in solution A and, therefore, it may also replace the combination of the sodium citrate and sodium acetate or their equivalents as hereinabove set forth. However, unlike the sodium acetate, if used alone in place of the combination of the sodium citrate and sodium acetate, the sodium hydroxyacetate requires as little as 10 gms. per liter which is approximately 0.13 mol per liter. This is believed to be due to the fact that if no water is present in this reagent, it is comparable to a concentration level of approximately 15 gms. per liter of sodium acetate. Additionally, it has been found that ammonium, potassium, or sodium tartrate may be used in place of either the sodium acetate or the sodium citrate in an amount from 12 gms. per liter to 20 gms. per liter thereof if used in place of both the sodium acetate and sodium citrate as hereinabove discussed. Finally, the sodium hypophosphite in solution A may be replaced by potassium hypophosphite or ammonium hypophosphite in approximately the same molar ratio as the sodium hypophosphite.

In solution B is has been found that the hydrochloric acid may be entirely omitted or its concentration increased as much as 100%, to that hereinabove set forth and the present invention method will further be operable. Thus, the number of mols per liter of the hydrochloric acid in solution B may vary from as little as 0 to as much as 0.72 mol per liter. Additionally, the amount of gold chloride in solution B may be varied from as little as 8 gms. per liter to as much as 16 gms. per liter. A concentration greater than 16 gms. per liter is a waste as the gold tends to precipitate out of solution instead of plating onto the surface.

In place of the nickelous chloride in solution A nickelous sulphate may be employed. The amount of nickelous sulphate which may be used may vary from as little as .02 to .13 mol per liter.

It is further believed that any of the other noble metals such as platinum, palladium, rhodium, or the like, may be substituted for gold as the metal salt of the chloride in solution B in accordance with the method of the present invention. It is believed that any noble metal, with the exception of silver, may thus be used.

Another specific example setting forth the proximate molar ratios in accordance with an alternative embodiment of the present invention as follows—

| | Mols/l. |
|---|---|
| Solution A: | |
| Nickelous chloride | 0.02 |
| Sodium citrate | 0.05 |
| Sodium acetate | 0.04 |
| Sodium hypophosphite | 0.09 |
| Solution B: | |
| Gold chloride | 0.04 |
| Hydrochloric acid | 0.36 |
| Hydrofluoric acid | 0.24 |
| Solution C: | |
| Hydrofluoric acid | 1.15 |

An additional example is as follows—

| | Mols/l. |
|---|---|
| Solution A: | |
| Nickelous chloride | 0.13 |
| Sodium hypophosphite | 0.09 |
| Ammonium tartrate | 0.08 |
| Solution B: | |
| Gold chloride | 0.04 |
| Hydrochloric acid | 0.36 |
| Hydrofluoric acid | 0.24 |
| Solution C: | |
| Hydrofluoric acid | 1.15 |

Still another example is as follows—

| | Mols/l. |
|---|---|
| Solution A: | |
| Nickelous sulphate | 0.13 |
| Sodium citrate | 0.05 |
| Sodium acetate | 0.04 |
| Sodium hypophosphite | 0.09 |
| Solution B: | |
| Gold chloride | 0.04 |
| Hydrochloric acid | 0.36 |
| Hydrofluoric acid | 0.24 |
| Solution C: | |
| Hydrofluoric acid | 1.15 |

A still further example is as follows—

| | Mols/l. |
|---|---|
| Solution A: | |
| Nickelous chloride | 0.13 |
| Sodium citrate | 0.05 |
| Sodium acetate | 0.04 |
| Sodium hypophosphite | 0.09 |
| Solution B: | |
| Gold chloride | 0.04 |
| Hydrofluoric acid | 0.24 |
| Solution C: | |
| Hydrofluoric acid | 1.15 |

It will be understood that approximately the same relative volumes of the solutions set forth in these examples will be used as was mentioned in connection with the example discussed hereinbefore.

It has been found that the molar concentration of the organic radical associated with the alkali ion in solution A namely the tartrate, acetate and citrate ions, need be at least 0.05 except when acetate alone is used in which case the concentration must be at least 0.12 to 0.13 mol per liter thereof. In order to further generalize the proportions of the reagents hereinbefore specified for solutions A, B and C, the molar ratios thereof which may be used are set forth hereinbelow.

| | Mols/l. |
|---|---|
| Solution A: | |
| Nickelous chloride or nickelous sulphate | 0.02 to 0.13 |
| Citrate ion | 0 to 0.13 |
| Acetate ion | 0 to 0.13 |
| Hydroxyacetate ion | 0 to 0.13 |
| Tartrate ion | 0 to 0.13 |
| Hypophosphite ion | 0.5 to 0.1 |
| Solution B: | |
| Gold chloride | 0.02 to 0.04 |
| Hydrochloric acid | 0 to 0.72 |
| Hydrofluoric acid | 0.14 to 0.24 |
| Solution C: | |
| Hydrofluoric acid | 0.69 to 1.15 |
| Solutions B and C: | |
| Gold chloride | 0.01 to 0.02 |
| Hydochloric acid | 0 to 0.36 |
| Hydrofluoric acid | 0.42 to 0.7 |
| Solutions, A, B and C: | |
| Nickelous chloride or nickelous sulphate | 0.017 to 0.11 |
| Citrate ion | 0 to 0.11 |
| Acetate ion | 0 to 0.11 |
| Hydroxyacetate ion | 0 to 0.11 |
| Tartrate ion | 0 to 0.11 |
| Hypophosphite ion | 0.043 to 0.086 |
| Chloride ion | 0.014 to 0.027 |
| Hydrochloric acid | 0 to 0.05 |
| Hydrofluoric acid | 0.06 to 0.1 |

It has been found that the strength of solution A may be varied to a considerable extent in carrying out the present invention method; that is, it may be diluted to 50% of that set forth hereinabove or may be increased by a factor of 20% by changing the amount of water in solution or changing concentration of solutes relative to each solvent.

Further, it is believed that solutions B and C may be produced as a single solution and this added to solution A in carrying out the hereinabove method, although it has been found convenient to produce three separate solutions in accordance with the presently preferred embodiment of the method described above.

An additional factor which is believed to affect the adhesion of the gold-nickel plate to the silicon is temperature. It is believed that the adhesion of the plate is proportional to the temperature of the solution at the time at which solutions A and B are added. Best results are obtained when solutions A and B are added as the nickel solution comes to a boil.

There has thus been described an improved method for producing an adherent low resistance ohmic contact to the surface of a body of semiconductive material.

What is claimed as new is:

1. A method for producing an ohmic low resistance adherent contact to a body of semiconductive material including the steps of bringing the semiconductive body into reactive engagement with a plating solution, said plating solution consisting essentially of a first solution of a salt selected from the group consisting of nickelous chloride and nickelous sulphate in an amount from 0.017 to 0.11 mol per liter; a combined solution of second, third, fourth and fifth solutions wherein said second solution is a solution of a salt selected from the group consisting of sodium citrate, ammonium citrate and potassium citrate in an amount from 0 to 0.11 mol per liter, said third solution is a solution of a salt selected from the group consisting of sodium hydroxyacetate, ammonium hydroxyacetate and potassium hydroxyacetate in an amount from 0 to 0.11 mol per liter, said fourth solution is a solution of a salt selected from the group consisting of sodium tartrate, ammonium tartrate, and potassium tartrate in an amount from 0 to 0.11 mol per liter, said fifth solution is a solution of a salt selected from the group consisting of sodium acetate, ammonium acetate and potassium acetate in an amount from 0 to 0.11 mol per liter in a combined minimum total of said second, third, fourth and fifth solutions amounting to at least 0.05 mol per liter unless one of said acetate salts alone is employed in which case the amount of said acetate salt must be in the range from 0.12 to 0.13 mol per liter; a sixth solution of a salt selected from the group consisting of sodium hypophosphite, ammonium hypophosphite and potassium hypophosphite in an amount from 0.043 to 0.086 mol per liter; a seventh solution consisting of a chloride of a noble metal, with the exception of silver, in an amount from 0.014 to 0.027 mol per liter; an eighth solution consisting of hydrochloric acid in an amount from 0 to 0.05 mol per liter; and a ninth solution consisting of hydrofluoric acid in an amount from 0.06 to 0.1 mol per liter.

2. A method for producing an ohmic low resistance adherent contact to a body of semiconductive material including the steps of bringing the semiconductive body into reactive engagement with a plating solution, said plating solution consisting essentially of: a first solution of a salt selected from the group consisting of nickelous chloride and nickelous sulphate in an amount from 0.02 to 0.13 mol per liter; a combined solution of a second, third, fourth and fifth solutions wherein said second solution is a solution of a salt selected from the group consisting of sodium citrate, ammonium citrate and potassium citrate, in an amount from 0 to 0.13 mols per liter, said third solution is a solution of a salt selected from the group consisting of sodium hydroxyacetate, ammonium hydroxyacetate and potassium hydroxyacetate in an amount from 0 to 0.13 mol per liter, said fourth solution is a solution of a salt selected from a group consisting of sodium tartrate, ammonium tartrate and potassium tartrate in an amount from 0 to 0.13 mol per liter, said fifth solution is a solution of a salt selected from the group consisting of sodium acetate, ammonium acetate and potassium acetate in an amount from 0 to 0.13 mol per liter in a combined minimum total of said second, third fourth and fifth solutions amounting to at least 0.05 mol per liter unless one of said acetate salts alone is employed, in which case the amount of said acetate salt is in the range from 0.12 to 0.13 mol per liter; and a sixth solution of a salt selected from a group consisting of sodium hypophosphite, ammonium hypophosphite and potassium hypophosphite in an amount from 0.05 to 0.1 mol per liter; and adding to said solution consisting of said six solutions a seventh solution consisting of a chloride of a noble metal, with the exception of silver, in an amount from 0.01 to 0.02 mol per liter, an eighth solution consisting of hydrochloric acid in an amount from 0 to 0.36 mol per liter and a ninth solution consisting of hydrofluoric acid in an amount from 0.042 to 0.07 mol per liter, said seventh, eighth and ninth solutions being added in a combined volume equal to approximately 16 parts per 100 relative to said combined first six solutions.

3. A method for producing an ohmic low resistance adherent contact to a body of semiconductive material including the steps of bringing the semiconductive body into reactive engagement with a plating solution, said plating solution consisting essentially of: a first solution of a salt selected from the group consisting of nickelous chloride and nickelous sulphate in an amount from 0.02 to 0.013 mol per liter; a combined solution of a second, third, fourth and fifth solutions wherein said second solution is a solution of a salt selected from the group consisting of sodium citrate, ammonium citrate and potassium citrate, in an amount from 0 to 0.13 mol per liter, said third solution is a solution of a salt selected from the group consisting of sodium hydroxyacetate and potassium hydroxyacetate in an amount from 0 to 0.13 mol per liter, said fourth solution is a solution of a salt selected from a group consisting of sodium tartrate, ammonium tartrate and potassium tartrate in an amount from 0 to 0.13 mol per liter, said fifth solution is a solution of a salt selected from the group consisting of sodium acetate, ammonium acetate and potassium acetate in an amount from 0 to 0.13 mol per liter in a combined minimum total of said second, third, fourth and fifth solutions amounting to at least 0.05 mol per liter unless one of said acetate salts alone is employed, in which case the amount of said acetate salt is in the range from 0.12 to 0.13 mol per liter; and a sixth solution of a salt selected from a group consisting of sodium hypophosphite, ammonium hypophosphite and potassium hypophosphite in an amount from 0.05 to 0.1 mol per liter; to which has been added said seventh solution consisting of a chloride of a noble metal, with the exception of silver, in an amount of 0.01 to 0.02 mol per liter, said eighth solution consisting of a solution of hydrochloric acid in an amount from 0 to 0.36 mol per liter and said ninth solution consisting of hydrofluoric acid from 0.42 to 0.7 mol per liter.

4. A method for producing an ohmic low resistance adherent contact to a body of semiconductive material including the steps of bringing the semi-conductive body into engagement with a plating solution consisting essentially of: a first solution of a salt selected from the group consisting of nickelous chloride and nickelous sulphate, a second solution of a salt selected from the group consisting of sodium citrate, ammonium citrate and potassium citrate, a third solution of a salt selected from the group consisting of sodium acetate, ammonium acetate and potassium acetate, a fourth solution of a salt selected from the group consisting of sodium hypophosphite, ammonium hypophosphite and potassium hypophosphite, a fifth solution consisting of gold chloride, a sixth solution consisting of hydrochloric acid and a seventh solution consisting of hydrofluoric acid, each of said seven solutions within said plating solution bearing the following approximate molar ratios respectively: 0.11, 0.04, 0.03, 0.08, 0.003, 0.03 and 0.1.

5. A method for producing an ohmic low resistance adherent contact to a body of semiconductive material including the steps of bringing the semi-conductive body into reactive engagement with a plating solution consisting essentially of: a first solution selected from the group consisting of nickelous chloride and nickelous sulphate, a second solution selected from the group consisting of sodium citrate, ammonium citrate and potassium citrate, a third solution selected from the group consisting of sodium acetate, ammonium acetate, and potassium acetate, a fourth solution selected from the group consisting of sodium hypophosphite, ammonium hypophosphite and potassium hypophosphite, in the approximate ratios of 30:15:5:10 gms. per liter respectively, to which has been added a fifth solution selected from the group consisting of the chlorides of the noble metals, with the exception of silver, and hydrochloric acid and hydrofluoric acid in the approximate ratios of 16:30:10 by volume, to which has previously been added a solution of one part of hydrofluoric acid to 40 parts distilled water.

6. A method for producing an ohmic low resistance adherent contact to a body of semiconductive material including the steps of bringing the semi-conductive body into reactive engagement with a plating solution consisting essentially of: a first solution selected from the group consisting of nickelous chloride and nickelous sulphate, a second solution selected from the group consisting of sodium citrate, ammonium citrate and potassium citrate, a third solution selected from the group consisting of sodium acetate, ammonium acetate and potassium acetate, a fourth solution selected from the group consisting of sodium hypophosphite, ammonium hypophosphite and potassium hypophosphite, in the approximate ratios of 0.13, 0.05, 0.04 and 0.09 mol per liter respectively, to which has been added a combined fifth, sixth and seventh solutions having a combined approximate volume relative to said combined first four solutions of 16 parts to 100, said fifth solution consisting of gold chloride, said sixth solution consisting of hydrochloric acid and said seventh solution consisting of hydrofluoric acid in the approximate ratios of 0.02, 0.18 and 0.7 mol per liter respectively.

7. A method for producing an ohmic low resistance adherent contact to a body of semiconductive material including the steps of bringing the semiconductive body into reactive engagement with a plating solution consisting essentially of: nickelous chloride, a second solution selected from the group consisting of sodium citrate, ammonium citrate and potassium citrate, a third solution selected from the group consisting of sodium acetate, ammonium acetate and potassium acetate, a fourth solution selected from the group consisting of sodium hypophosphite and potassium hypophosphite in the approximate ratios of 0.13, 0.05, 0.04 and 0.09 mol per liter respectively, adding to said first solution a second solution consisting essentially of a combination including a fifth, sixth and seventh solutions having a combined approximate volume relative to said first four solutions of 16 parts to 100, said fifth solution selected from the group consisting of gold chloride, said sixth solution consisting of hydrochloric acid and a seventh solution consisting of hydrofluoric acid, in the approximate ratios of 0.02, 0.10 and 0.7 mol per liter respectively.

8. A method for producing an ohmic low resistance adherent contact to a body of semiconductive material including the steps of bringing the semi-conductive body into reactive engagement with a first plating solution consisting essentially of: a combination of a first solution of nickelous chloride, a second solution selected from the group consisting of sodium tartrate, ammonium tartrate and potassium tartrate, a third solution selected from the group consisting of sodium hypophosphite, ammonium hypophosphite and potassium hypophosphite, in the approximate ratios of 0.13, 0.08 and 0.9 mol per liter respectively, to which has been added a second plating solution consisting essentially of a combination of a fourth, fifth and sixth solutions having a combined approximate volume relative to said first three solutions of 16 parts to 100, said fourth solution consisting of gold chloride, said fifth solution consisting of hydrochloric acid, and said sixth solution consisting of hydrofluoric acid in the approximate ratios of 0.02, 0.18 and 0.7 mol per liter respectively.

9. A method of producing an ohmic low resistance adherent contact to a body of semiconductive material including the steps of placing the semiconductive body into a first plating solution consisting essentially of the following reagents:

| | | Mols per liter |
|---|---|---|
| a first solution selected from the group consisting of nickelous chloride and nickelous sulphate | approximately | 0.13. |
| a second solution selected from the group of sodium citrate, ammonium citrate and potassium citrate | approximately | 0.04. |
| a third solution selected from the group of sodium acetate, ammonium acetate and potassium acetate | approximately | 0.06. |
| and a fourth solution selected from the group of sodium hypophosphite, ammonium hypophosphite and potassium hypophosphite | approximately | 0.09. |

adjusting the pH of said first plating solution to between 4.0 and 4.5; heating said first plating solution to a temperature in the range from 90° C. to 100° C.; placing said semiconductive wafer into said first plating solution; adding to said first plating solution a second plating solution consisting essentially of a combined fifth, sixth and seventh solutions having a combined approximate volume relative to said first four solutions of 16 parts to 100, said fifth solution selected from the group consisting of chlorides of the noble metals, with the exception of silver, in the amount of 0.014 to 0.027 mol per liter, said sixth solution consisting of hydrochloric acid in the amount of 0 to 0.05 mol per liter, said seventh solution consisting of hydrofluoric acid in the amount of 0.06 to 0.1 mol per liter, and thereafter removing said wafer from said solution.

10. A method for producing an ohmic low resistance adherent contact to a body of semiconductive material including the steps of preparing a plating solution consisting essentially of the following:

| | Mols per liter |
|---|---|
| a first solution selected from the group consisting of nickelous chloride and nickelous sulphate | approximately 0.02 to 0.13. |
| a second solution selected from the group of sodium citrate, ammonium citrate and potassium citrate | approximately 0 to 0.13. |
| a third solution selected from the group consisting of sodium acetate, ammonium acetate and potassium acetate | approximately 0 to 0.13. |
| a fourth solution selected from the group consisting of sodium tartrate, ammonium tartrate and potassium tartrate | approximately 0 to 0.13. |
| a fifth solution selected from the group consisting of sodium hydroxyacetate, ammonium hydroxyacetate and potassium hydroxyacetate | approximately 0 to 0.13. |
| a sixth solution selected from the group consisting of sodium hypophosphite, ammonium hypophosphite and potassium hypophosphite | approximately 0.05 to 0.1. |
| a seventh solution selected from the group consisting of a noble metal chloride with the exception of silver | approximately 0.01 to 0.02. |
| hydrochloric acid | approximately 0 to 0.36. |
| hydrofluoric acid | approximately 0.42 to 0.7. |

heating said solution to a temperature of at least 90° C.; and placing said semiconductive body into said plating solution for approximately three minutes; and thereafter removing said body from said plating solution.

11. A method for producing an ohmic low resistance adherent contact to a body of silicon semiconductive material including the steps of preparing a first plating solution consisting essentially of the following:

| | Mols per liter. |
|---|---|
| a first solution selected from the group consisting of nickelous chloride and nickelous sulphate | approximately 0.017 to 0.11. |
| a second solution selected from the group of sodium citrate, ammonium citrate and potassium citrate | approximately 0.17 to 0.11. |
| a third solution selected from the group consisting of sodium acetate, ammonium acetate and potassium acetate | approximately 0 to 0.11. |
| a fourth solution selected from the group consisting of sodium tartrate, ammonium tartrate and potassium tartrate | approximately 0 to 0.11. |
| a fifth solution selected from the group consisting of sodium hydroxyacetate, ammonium hydroxyacetate and potassium hydroxyacetate | approximately 0 to 0.11. |
| a sixth solution selected from the group consisting of sodium hypophosphite, ammonium hypophosphite and potassium hypophosphite | approximately 0.043 to 0.086. |

heating said solution to a temperature to at least 90° C.; placing said silicon semiconductive body into said first plating solution; adding to said first plating solution a second plating solution consisting essentially of the following: gold chloride 0.0014 to 0.0027 mol per liter, hydrochloric acid 0 to 0.05 mol per liter and hydrofluoric acid 0.06 to 0.1 mol per liter; removing said silicon semiconductive body from said solution so that the total times of immersion of said body in said first and second first plating solution, is approximately three minutes.

References Cited in the file of this patent

UNITED STATES PATENTS

| | | |
|---|---|---|
| 1,207,218 | Roux | Dec. 5, 1916 |
| 2,694,017 | Reschan et al. | Nov. 9, 1954 |
| 2,884,344 | Ramirez | Apr. 28, 1959 |